(12) United States Patent
Negrello et al.

(10) Patent No.: US 8,789,451 B2
(45) Date of Patent: Jul. 29, 2014

(54) BLANKING DIE ASSEMBLY WITH AT LEAST ONE DEVICE FOR DIFFERENTIALLY ROTATING THE BLANKING UNIT

(75) Inventors: Massimo Negrello, Lainate (IT); Dario Muti, Milan (IT); Maurizio Perucchi, Valera Fratta (IT); Mario Checchin, Tradate (IT)

(73) Assignee: Corrada S.p.A., Lainate (Milano) (IT)

( * ) Notice: Subject to any disclaimer, the term of this patent is extended or adjusted under 35 U.S.C. 154(b) by 229 days.

(21) Appl. No.: 13/554,374

(22) Filed: Jul. 20, 2012

(65) Prior Publication Data

US 2013/0025430 A1 Jan. 31, 2013

(30) Foreign Application Priority Data

Jul. 25, 2011 (IT) .............................. MI2011A1378

(51) Int. Cl.
*B21D 28/12* (2006.01)
(52) U.S. Cl.
USPC .............................................. 83/531; 83/691
(58) Field of Classification Search
USPC ........... 83/691, 518, 523, 531, 535, 618–620, 83/684–689
See application file for complete search history.

(56) References Cited

U.S. PATENT DOCUMENTS

| | | | | |
|---|---|---|---|---|
| 2,017,247 | A * | 10/1935 | Hodge ............................. | 279/76 |
| 3,449,991 | A * | 6/1969 | Daniels .......................... | 83/76.9 |
| 3,685,380 | A | 8/1972 | Daniels | |
| 3,752,028 | A * | 8/1973 | Waizmann et al. ............. | 83/685 |
| 4,096,774 | A * | 6/1978 | Kaufmann ...................... | 83/552 |
| 4,685,613 | A | 8/1987 | Schambre | |
| 5,054,353 | A * | 10/1991 | Haack et al. .................. | 83/639.5 |
| 5,193,426 | A * | 3/1993 | Dunn .............................. | 83/277 |
| 5,669,866 | A | 9/1997 | Julian et al. | |
| 8,104,390 | B2 * | 1/2012 | Chizek ............................ | 83/660 |
| 2004/0154453 | A1 * | 8/2004 | Kobayashi ..................... | 83/691 |
| 2006/0070233 | A1 | 4/2006 | Neuenschwander et al. | |
| 2010/0229701 | A1 | 9/2010 | Thielges et al. | |

FOREIGN PATENT DOCUMENTS

| | | |
|---|---|---|
| DE | 1502721 | 1/1970 |
| EP | 1859876 | 11/2007 |

OTHER PUBLICATIONS

Italian Search Report completed on Apr. 2, 2012 for Italian Application No. MI2011A001378 filed on Jul. 25, 2012 in the name of Corrada S.P.A.
Italian Search Report completed on Mar. 28, 2012 for Italian Application No. MI2011A000904 filed on May 20, 2011 in the name of Corrada S.P.A.
Italian Written Opinion completed on Mar. 28, 2012 for Italian Application No. MI2011A000904 filed on May 20, 2011 in the name of Corrada S.P.A.

* cited by examiner

*Primary Examiner* — Sean Michalski
(74) *Attorney, Agent, or Firm* — Steinfl & Bruno LLP

(57) ABSTRACT

A sheet metal blanking die assembly is described. The assembly has a lower and an upper part and guide columns to maintain the parts aligned during the movement of the upper part relative to the lower part. The upper and lower part present flat parallel mutually opposing horizontal portions. The lower flat portion receives the sheet metal, while the upper flat portion presents a plurality of punches projecting downwards from it when the die assembly is closed by the action of a press. Blanking recesses are present in the flat lower portion to receive the respective punches. The die assembly presents a differential rotation device for a blanking unit positioned to correspond with at least one blanking position.

4 Claims, 3 Drawing Sheets

BLANKING DIE ASSEMBLY WITH AT LEAST ONE DEVICE FOR DIFFERENTIALLY ROTATING THE BLANKING UNIT

CROSS REFERENCE TO RELATED APPLICATIONS

The present application claims priority to Italian patent application MI2011A001378 filed on Jul. 25, 2011, which is incorporated herein by reference in its entirety. The present application may also be related to U.S. application Ser. No. 13/474,511 filed on May 17, 2012, which is also incorporated herein by reference in its entirety.

FIELD

The present disclosure relates to a blanking die assembly with at least one device for differentially rotating the blanking unit.

BACKGROUND

Common blanking die assemblies are known, for example for producing magnetic laminations and/or magnetic lamination packs for electric motors and generators. These die assemblies usually present a lower part and an upper part. These two parts are mutually aligned by guide columns. The upper and lower parts of the die assembly present corresponding substantially flat portions known respectively as the flat lower portion or die plate and the flat upper portion or punch guide plate or punch stripping plate. With the die assembly open, sheet metal in the form of a strip is fed to the die assembly, to rest on the die plate. The die assembly upper part presents a plurality of punches which project from the punch guide plate during blanking, when the die assembly is closed by the action of the press. The punches then blank the laminations. For blanking purposes, recesses are provided in the die plate in positions corresponding with the punches, to receive said punches in order to implement the blanking operation.

On closing the die assembly, the punches press on the sheet metal in positions corresponding with the portion under which the relative recesses lie. Blanking is then achieved by cutting forces which the punches generate on the sheet metal at the recesses.

Blanking hence enables laminations to be obtained which during production can remain loose or, by means of suitable devices, be stacked together in mutual succession to form lamination packs. These lamination packs also present slots, for example slots to receive magnets, and cooling slots, which define axes parallel to each other and parallel to an axial hole.

The need to produce packs with determined characteristics, for example cavity spiralling, has lead to the creation of blanking die assemblies which enable this to be achieved by rotating the detachment die, in which the pack is formed.

This solution is no longer satisfactory as products produced by blanking have increasingly more complex shapes, for example presenting slots orientated differently from each other. To achieve these product types, the laminations of one and the same pack cannot present the same geometry.

SUMMARY

An aspect of the present disclosure is to provide a blanking die assembly able to overcome the aforesaid drawbacks and to solve the relative technical problems.

In particular, according to an aspect of the present disclosure, a sheet metal blanking die assembly is described, comprising: a lower part, an upper part and guide columns, the guide columns being arranged to maintain the parts aligned during movement of the upper part relative to the lower part in order to close or open the die assembly or to blank the sheet metal to obtain relative blanked laminations, the die upper part and lower part of the die assembly comprising flat parallel mutually opposing upper and lower horizontal portions, the lower flat portion being adapted to receive the sheet metal, the upper flat portion comprising a plurality of punches which project downwards from the upper flat portion at the moment of blanking when, by the action of a press, the die assembly is closed onto said flat lower portion, blanking recesses being provided to receive respective punches, the assembly further comprising at least one differential rotation device for a blanking unit positioned to correspond with at least one blanking position, said differential rotation device comprising: a punch holder housed in an upper part of the die assembly, the punch holder comprising a plurality of through seats adapted to house punches via their heads; a guide means housed in a punch guide plate, housed in a lower portion of the upper part of the die assembly, said guide means being positioned to correspond with the punch holder and comprising a plurality of through recesses corresponding to said seats of the punch holder, said recesses being adapted to slidingly house the punches; and a die housed in a die plate positioned in the lower part of the die assembly, said die presenting in positions corresponding with said seats of the die a plurality of recesses to house the punches during a sheet metal blanking stage, wherein said punch holder, guide and die: form a blanking unit adapted to rotate about an X axis within said upper part and lower part of the die assembly; present respectively further seats to house centring means, and are able to rigidly rotate mutually by way of said centring means.

This and other aspects which will be apparent to the expert of the art are attained by a blanking die assembly with at least one device for differentially rotating the blanking unit.

BRIEF DESCRIPTION OF THE DRAWINGS

The teachings of the present disclosure will be more apparent from the accompanying drawings, which are provided by way of non-limiting example and in which.

DETAILED DESCRIPTION

Figure 1A:
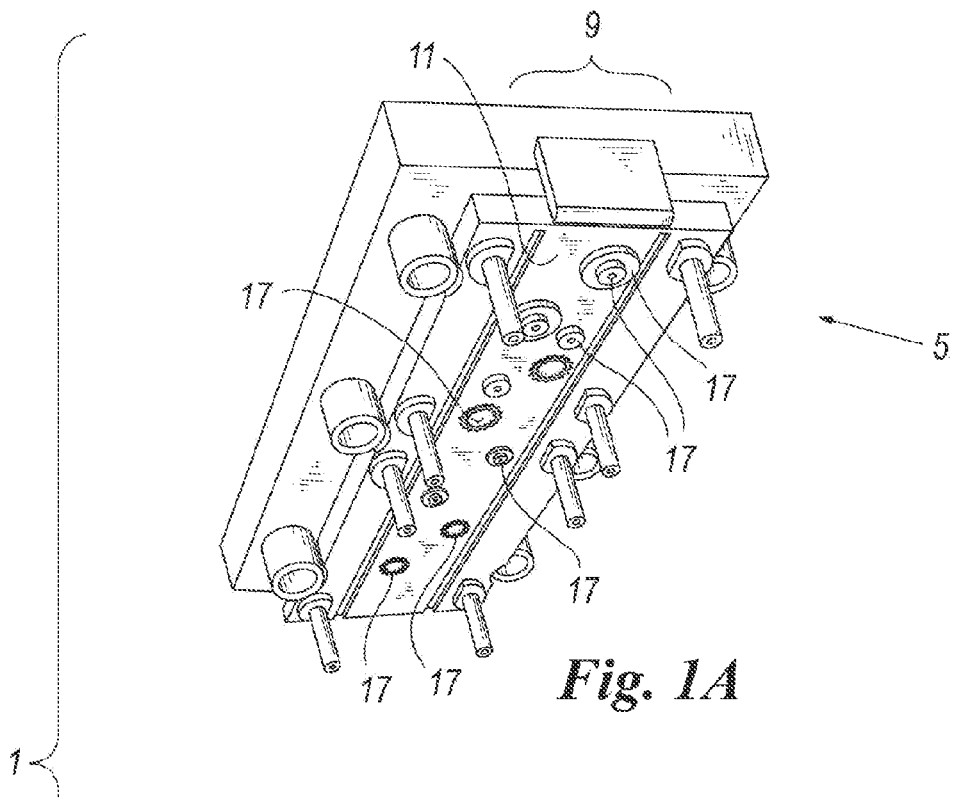
FIG. 1A is a perspective view of the upper part of a blanking die assembly for laminations.
Figure 1B:
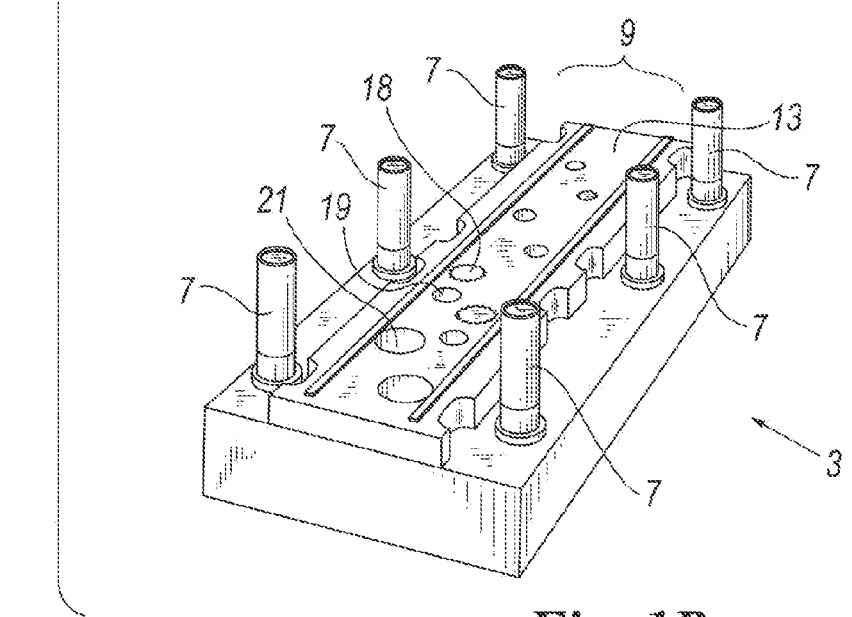
FIG. 1B is a perspective view of the lower part of the same die assembly.

With reference to FIGS. 1A and 1B, a blanking die assembly is indicated overall by 1. The die assembly 1 usually presents a lower part 3 and an upper part 5. These two parts are mutually aligned by the guide columns 7 of the die assembly 1. The guide columns 7 enable the die assembly upper part 5 to be maintained aligned with the lower part 3 during closure and opening operations and during blanking. In a central portion 9 of the die assembly 1 the die assembly upper part 5 and lower part 3 present substantially flat portions known respectively as the flat upper portion 11 or punch guide plate or punch stripping plate, and the flat lower portion 13 or die plate. With the die assembly 1 open, sheet metal normally in the form of a strip L (FIG. 2) is fed into the die assembly 1 so as to rest on the die plate 13.

The upper part 5 of the die assembly 1 presents a plurality of punches 17 which at the moment of blanking project from said punch guide plate 11 to penetrate into the relative recesses present in the die plate 13.

The die assembly 1 can present, for example, a plurality of blanking positions 18, 19 and 21 (FIG. 1). By differently shaping the punches, these blanking positions enable blanking of different portions of one and the same lamination.

Figure 3:
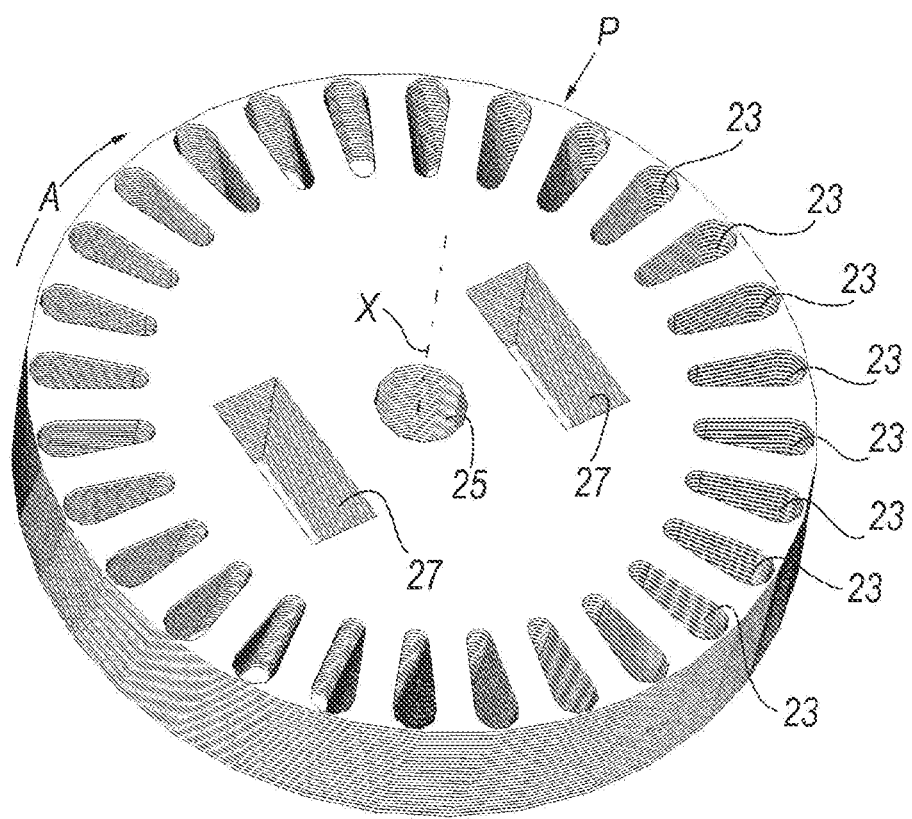
FIG. 3 is a perspective view of a lamination pack obtainable by the present disclosure.

With reference to FIGS. 1 and 3, the die assembly 1 can present, for example:

a first blanking position 18 for forming the slots present in the central portion of the lamination, for example the cavity 25 of the axial hole and the two magnet slots 27;

a second blanking position 19 for forming the outer slots 23;

a third blanking position 21 enabling the lamination to be detached from the sheet metal fed to the die assembly.

Figure 2:
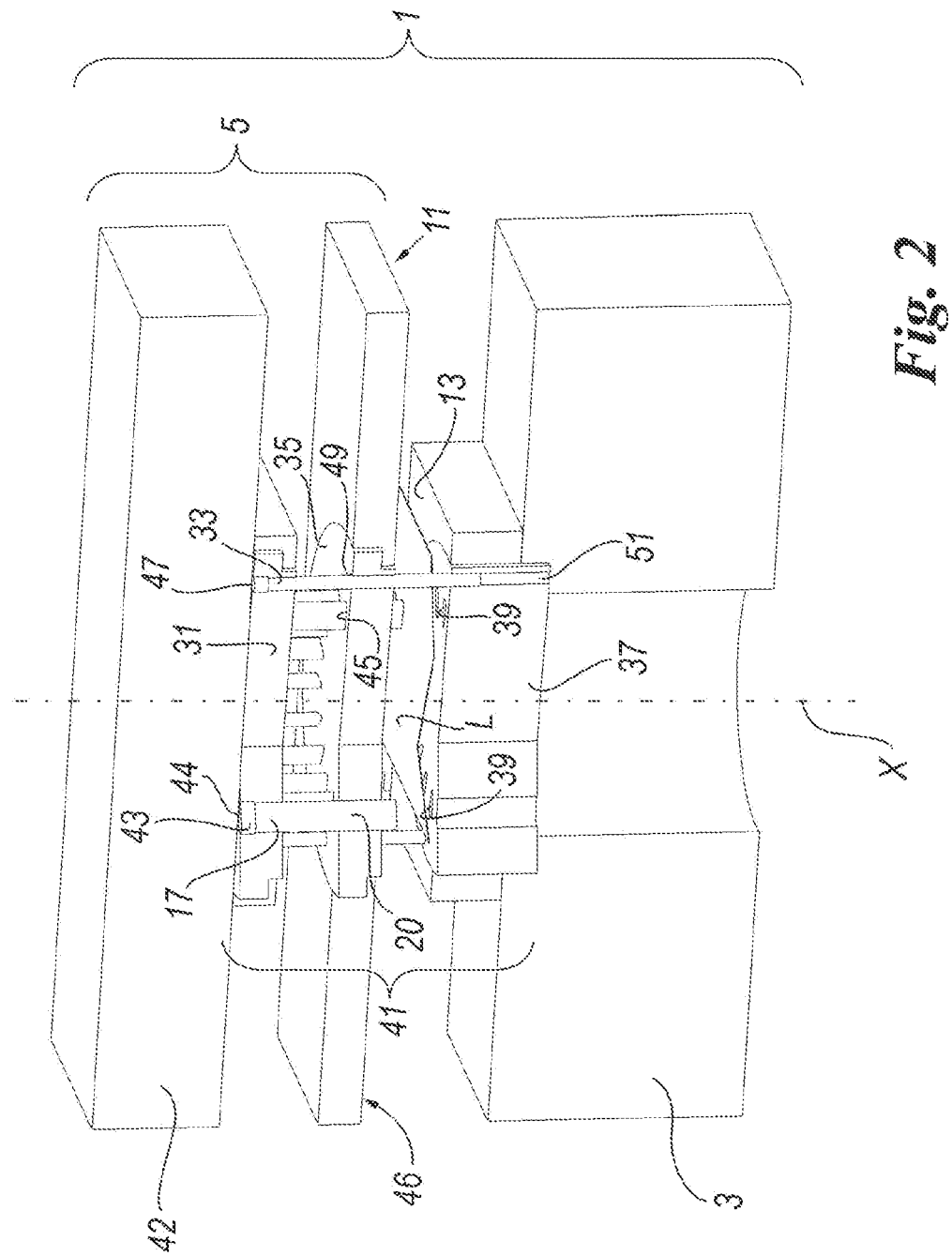
FIG. 2 is a perspective cut-away view of the blanking unit.

The second blanking position 19 presents a plurality of punches 17, a punch holder 31, a plurality of centring means 33, a guide 35 and a die 37 presenting a plurality of recesses 39. The combination of these elements defines a blanking unit 41. The blanking unit 41 can rotate about an axis X defined by the geometry of the blanking unit 41 (FIG. 2).

The punch holder 31 is housed in the upper part 5 of the die assembly 1 and presents a plurality of punches 17. The punch holder 31 presents a plurality of seats (only one of which, indicated by 44, can be seen in the figures) to house a plurality of said punches 17 via the head 43 of these latter. These punches project downwards from the upper part 5 of the die assembly 1.

The punch holder 31, housed within the upper part 5 of the die assembly 1, has a shape such as to enable it to be rotated (about the axis X) within the upper part 5.

In a lower portion of the upper part 5 of the die assembly 1 a punch guide plate 46 is positioned in which a guide means 35 is housed in a position corresponding with the punch holder 31. In a manner similar to the punch holder 31, the guide means 35 has a shape such as to enable it to be rotated (about the axis X) within the punch guide plate 46. At the aforedescribed seats 44, the guide means 35 presents a plurality of recesses 45 to slidingly house a lower part or body 20 of the punches 17, enabling the fed sheet metal L (FIG. 2) to be blanked.

At the guide means 35 the lower part 3 of the die assembly 1 houses a die 37. In a manner similar to the guide means 35, the die 37 presents recesses 39 positioned to correspond with recesses 45 of said guide means 35. When the upper part 5 of the die assembly 1 is lowered, the recesses 39 receive the body 20 of the punches 17, to enable blanking of the metal strip L.

In a similar manner to the guide means 35, the die 37 has a shape such as to enable it to rotate (about the axis X) within the lower part 3 of the die assembly 1.

The die 37 is rotated by conventional drive devices (not shown in the figure), comprising, for example, an electric motor or a pneumatic actuator suitably connected for example to said die 37.

To enable correct blanking, the punches 17 and the seats 39 should be constantly coaxial. To achieve this, the punch holder 31, the guide means 35 and the die 37 should rotate in a mutually rigid configuration. For this purpose, these three elements present a plurality of corresponding coaxial recesses 47, 49, 51 (FIG. 2) in which a plurality of centring means 33 are housed, for example in the form of bars, which enable the punch holder 31, the guide 35 and the die 37 to rotate rigidly together.

In particular:

the punch holder 31 presents a plurality of seats 47 to house the centring means 33;

the guide means 35 presents a plurality of seats 49 to slidingly receive the centring means 33;

the die 37 presents a plurality of seats 51 to slidingly receive the centring means 33.

Simultaneous rotation of the entire blanking unit is achieved, for example, by the centring means 33.

The ability to rotate the blanking unit 41 about the axis X enables two laminations to be blanked in succession with different geometry in the same blanking position, by virtue of the different angular position of the punches 17 and of the recesses 39.

The rotation of the blanking unit 41 and, in particular, the movement of the centring means 33, is limited by the presence of the sheet metal strip L within the die assembly 1. This means that in addition to a maximum angle of rotation of the blanking unit 41 (from an initial position to a final position) in a direction A, this latter must be counter-rotated to return to its initial position. This counter-rotation is necessary to prevent the centring means 33 (FIG. 2) from striking against the sheet metal strip L fed to the die, hence deforming/damaging it and preventing its normal advancement.

The first blanking position 18 (FIG. 1) presents a plurality of punches projecting downwards from the upper part 5 of the die assembly 1, and also of recesses in the lower part 3 of the die assembly 1. These recesses are located in correspondence with said punches. These punches and die are fixed and cannot rotate within the die assembly 1.

The third blanking position 21 enables the laminations to be detached/separated from the sheet metal strip L fed to the die assembly 1. When in this blanking position, the laminations are detached from the strip (L) and then stacked (in conventional manner) onto the previously banked laminations. Following rotation of the second blanking unit and hence by virtue of the different angular position of the slots 23, the lamination packs (P) obtained (FIG. 3) present external slots 23 of spiral shape (FIG. 3). In particular, these slots 23 extend within the lamination pack in a spiral pattern about the axis X defined by the slot 25 forming the axial hole.

Assuming that the upper part 5 of the of the die assembly 1 is in its raised position and the die assembly 1 is open, the operation according to several embodiments of the present disclosure is substantially as follows. Each time the die is closed by a press (an action commonly known as press impact):

the blanking unit 41 is rotated to enable a different position of the punch 17 and of the recesses 39 (depending on the product to be obtained, for some press impacts rotation may not be undertaken);

at the same time, the sheet metal strip L is made to advance within the die through one step (equal to the distance between two successive positions);

the die upper part 5 is lowered to enable lamination blanking.

This stage can be repeated a required number of times to obtain the desired pack and spiralling. Having achieved maximum rotation of the blanking unit 41, this latter is returned to its initial position.

According to a further embodiment of the disclosure, in contrast to what described in the first embodiment of the present disclosure, the first blanking position 18 presents a blanking unit able to rotate about its own axis X. Rotation of the blanking unit determines the rotation of the punches defining the apertures 27 and the axial hole 25. Hence compared with two sheet metal strip portions blanked in succession, the rotation results in the formation of apertures 25 having different orientation.

In the second blanking position 19, relative to the same lamination of the first position, a plurality of punches (for defining/blanking the slots 23) are present together with a die positioned in the lower part of the die assembly. These punches and die are fixed and cannot rotate within the die assembly 1.

The third blanking position enables the lamination to be detached from the fed sheet metal strip by blanking the external profile of the lamination. In this position, said laminations can be simultaneously stacked in conventional manner to generate a pack of laminations (for example a rotor pack). This third position also enables the pack to be rotated, by means of the detachment plate, in order to position the magnet slots of the pack laminations coaxially and to generate the outer slots spiralling.

Assuming that the upper part 5 of the die assembly 1 is raised and the die assembly 1 is open, the invention operates substantially in the following manner. At each press impact:
- the blanking unit positioned in the first blanking position is rotated (for example in the direction of the arrow A), to enable rotation of the punches defining the axial hole 25 and the apertures 27 (depending on the product to be obtained, for certain press impacts the rotation could also not be carried out);
- the blanking unit positioned in the third blanking position is simultaneously rotated, for example also in the direction of the arrow A, in order to bring the apertures 27 into alignment and nullify the rotation of those apertures 27 imposed by the first blanking position;
- the sheet metal strip is advanced through one step to move a respective sheet metal portion for example from the first blanking position to the second blanking position;
- the upper part 5 of the die is lowered to blank the sheet metal by means of the punches.

In a similar manner to the first embodiment of the disclosure, rotation of the blanking unit in the first blanking position takes place, for example, in accordance with an arrow A as far as a predetermined maximum angle of rotation. Beyond that rotation, the blanking unit in question undergoes a return rotation (from a final position to an initial position) in order to prevent the centring means (FIG. 2) from impacting against the sheet metal fed to the die assembly, so damaging it and preventing its normal advancement.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

In particular, it will be understood that various modifications may be made without departing from the spirit and scope of the present disclosure. Accordingly, other embodiments are within the scope of the following claims.

The invention claimed is:

1. A sheet metal blanking die assembly, comprising:
a lower part,
an upper part and
guide columns, the guide columns being arranged to maintain the parts aligned during movement of the upper part relative to the lower part in order to close or open the die assembly or to blank the sheet metal to obtain relative blanked laminations,
the die upper part and lower part of the die assembly comprising flat parallel mutually opposing upper and lower horizontal portions, the lower flat portion being adapted to receive the sheet metal, the upper flat portion comprising a plurality of punches which project downwards from the upper flat portion at the moment of blanking when, by the action of a press, the die assembly is closed onto said flat lower portion, blanking recesses being provided to receive respective punches, the assembly further comprising at least one differential rotation device for a blanking unit positioned to correspond with at least one blanking position, said differential rotation device comprising:
a punch holder housed in an upper part of the die assembly, the punch holder comprising a plurality of through seats adapted to house punches via their heads;
a guide means housed in a punch guide plate, housed in a lower portion of the upper part of the die assembly, said guide means being positioned to correspond with the punch holder and comprising a plurality of through recesses corresponding to said seats of the punch holder, said recesses being adapted to slidingly house the punches; and
a die housed in a die plate positioned in the lower part of the die assembly, said die presenting in positions corresponding with said seats of the die a plurality of recesses to house the punches during a sheet metal blanking stage,
wherein said punch holder, guide and die:
form a blanking unit adapted to rotate about an X axis within said upper part and lower part of the die assembly;
present respectively further seats to house centring means, and
are able to rigidly rotate mutually by way of said centring means.

2. The blanking die assembly according to claim 1, wherein the blanking unit is rotated about the X axis by a rotation means connected to said blanking unit.

3. The blanking die assembly according to claim 2, wherein said rotation means is an electric motor or a pneumatic actuator.

4. The blanking die assembly according to claim 1, wherein the blanking unit can rotate in both directions about the X axis.

* * * * *